(12) United States Patent
Favaretto

(10) Patent No.: US 7,503,623 B2
(45) Date of Patent: Mar. 17, 2009

(54) METAL FRAME MADE UP OF THE UNION OF A PLURALITY OF EXTRUDED ELEMENTS, AND METHOD FOR ITS FABRICATION

(75) Inventor: Fabrizio Favaretto, Formigine (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 10/583,458

(22) PCT Filed: Dec. 15, 2004

(86) PCT No.: PCT/IB2004/004204

§ 371 (c)(1),
(2), (4) Date: Jun. 21, 2007

(87) PCT Pub. No.: WO2005/061311

PCT Pub. Date: Jul. 7, 2005

(65) Prior Publication Data

US 2007/0246972 A1    Oct. 25, 2007

(30) Foreign Application Priority Data

Dec. 19, 2003   (IT)  ............................ BO2003A0764

(51) Int. Cl.
*B62D 27/00* (2006.01)
(52) U.S. Cl. ................ 296/203.01; 29/897.2; 52/653.2; 280/798; 296/29; 296/205; 403/170
(58) Field of Classification Search ............... 296/29, 296/30, 203.01, 205; 29/897.2; 52/648.1, 52/653.1, 653.2, 655.1, 656.9; 105/413; 180/311; 280/781, 785, 797, 798, 799, 800; 403/170, 171, 205, 270
See application file for complete search history.

(56) References Cited

U.S. PATENT DOCUMENTS 2,723,107 A * 11/1955 Parker .......................... 256/24
2,742,690 A *  4/1956 Kunkel ......................... 29/417

(Continued)

FOREIGN PATENT DOCUMENTS

| DE | 4407501 A1 |   | 9/1995 |
| EP | 598549 A1  | * | 5/1994 |
| FR | 2702726 A1 | * | 9/1994 |
| GB | 1497403    |   | 1/1978 |
| JP | 04038277 A | * | 2/1992 |
| JP | 04312639 A | * | 11/1992 |
| JP | 05319302 A | * | 12/1993 |

*Primary Examiner*—Paul A Chenevert
(74) *Attorney, Agent, or Firm*—John A. Artz; Dickinson Wright PLLC

(57) ABSTRACT

A metal frame made up of a plurality of linear bars, which have a constant cross section, are obtained by extrusion, and are joined to one another by means of welding at structural nodes defined by jointing bodies provided with pockets for housing the linear bars. The jointing bodies have box type structures and are made up of the union of respective a load-bearing element, which is obtained by extrusion and has a given direction of extrusion, with a pair of plane closing metal sheets, which are set perpendicular to the direction of extrusion and are welded to the load-bearing element on opposite sides of the load-bearing element. The load-bearing element may also be formed by the lateral union of a number of simple elements, each of the simple elements being obtained directly via extrusion and having a given direction of extrusion parallel to the direction of extrusion of the other simple elements, and wherein the simple elements are joined to one another laterally by mechanical slots.

14 Claims, 6 Drawing Sheets

U.S. PATENT DOCUMENTS

| | | | | |
|---|---|---|---|---|
| 3,480,313 A * | 11/1969 | Halko, Jr. | | 403/295 |
| 4,125,973 A * | 11/1978 | Lendrihas | | 249/188 |
| 4,988,230 A | 1/1991 | Banthia et al. | | |
| 5,059,056 A * | 10/1991 | Banthia et al. | | 403/170 |
| 5,435,110 A | 7/1995 | Stol et al. | | |
| 5,593,245 A * | 1/1997 | Herz et al. | | 403/403 |
| 5,609,004 A * | 3/1997 | Kreis | | 52/655.1 |
| 5,624,160 A * | 4/1997 | Koch et al. | | 297/452.2 |
| 5,660,005 A * | 8/1997 | Tacoma | | 52/93.2 |
| 5,741,026 A * | 4/1998 | Bonnville | | 280/781 |
| 5,767,476 A | 6/1998 | Imamura | | |
| 6,296,300 B1 * | 10/2001 | Sato | | 296/187.08 |
| 6,305,866 B1 * | 10/2001 | Aota et al. | | 403/270 |
| 6,470,990 B1 * | 10/2002 | Panoz | | 180/311 |
| 6,922,966 B2 * | 8/2005 | Hein et al. | | 52/655.1 |
| 2002/0050064 A1 * | 5/2002 | Furuse et al. | | 29/897.2 |
| 2002/0100243 A1 * | 8/2002 | Hein et al. | | 52/655.1 |
| 2004/0232686 A1 * | 11/2004 | Locke | | 280/781 |
| 2006/0064874 A1 * | 3/2006 | Bonnville et al. | | 29/897 |
| 2008/0169684 A1 * | 7/2008 | Hedderly | | 296/203.01 |

* cited by examiner

US 7,503,623 B2

METAL FRAME MADE UP OF THE UNION OF A PLURALITY OF EXTRUDED ELEMENTS, AND METHOD FOR ITS FABRICATION

TECHNICAL FIELD

The present invention relates to a metal frame made up of the union of a plurality of extruded elements and to a method for its fabrication.

The present invention finds advantageous application in the automotive sector for the fabrication of a metal frame of a motor vehicle, to which the ensuing treatment will make explicit reference without this implying any loss of generality.

BACKGROUND

A frame for a motor vehicle made up of the union of a plurality of extruded elements comprises a plurality of linear bars, which have a constant cross section, are obtained by extrusion, and are joined to one another by means of welding at structural nodes defined by jointing bodies provided with pockets for housing the ends of the linear bars themselves.

Currently, in a frame for a motor vehicle obtained by the union of a set of extruded metal elements, all the elements of the frame are obtained by extrusion, with the exception of the jointing bodies (i.e., the points in which a number of elements of the frame are joined), which are obtained by casting in so far as they have a complex shape that cannot be obtained by extrusion. However, the jointing bodies obtained by casting prove heavy and costly (particularly in the case of limited production of sports cars) as a result of the high costs for fabrication of the dies. Furthermore, once a die for a jointing body has been made, it is difficult to make any modification to the die itself to provide constructional variants of the jointing body itself.

SUMMARY OF THE INVENTION

The purpose of the present invention is to provide a metal frame made up of the union of a plurality of extruded elements and a method for its fabrication, which are easy and economically advantageous to produce and implement and are, at the same time, free from the drawbacks described above.

BRIEF DESCRIPTION OF THE DRAWINGS

The present invention will now be described with reference to the annexed drawings, which illustrate a non-limiting example of embodiment thereof, and in which.

DETAILED DESCRIPTION OF THE INVENTION

Figure 1:
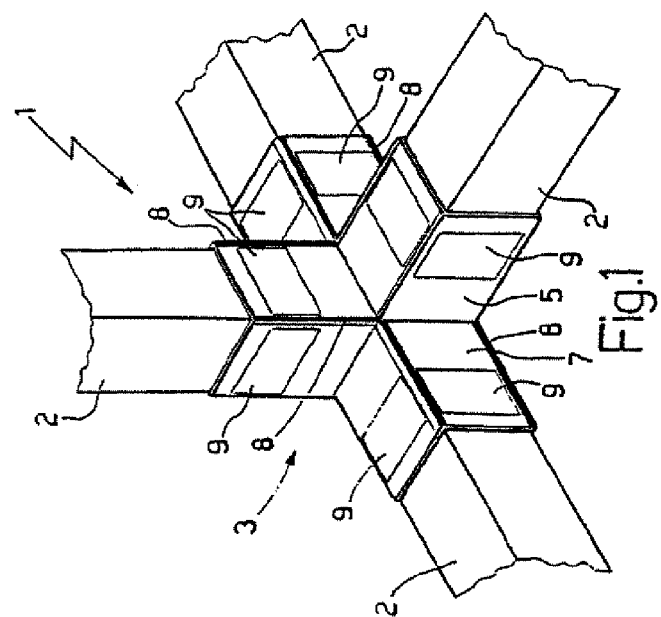
FIG. 1 is a perspective view of a part of a frame made according to the present invention and comprising a jointing body and a number of linear bars.
Figure 2:
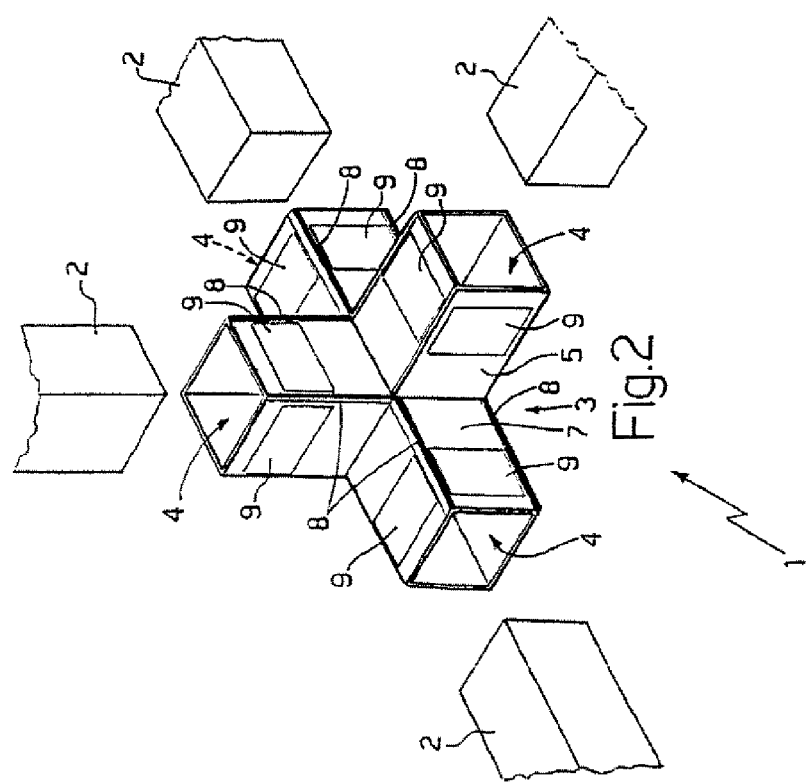
FIG. 2 is an exploded perspective view of the frame of FIG. 1.

In FIG. 1, designated by the reference number 1 is a metal frame, which is only partially illustrated and comprises a number of linear bars 2, which have a constant cross section and are obtained by extrusion. The linear bars 2 are joined to one another by means of welding at structural nodes defined by jointing bodies 3. In particular, FIG. 1 illustrates a node of the frame 1, which is defined by a respective jointing body 3 and is designed to obtain the union of four linear bars 2. According to what is illustrated in FIG. 2, the jointing body 3 has four pockets 4, each of which is designed to house an end of a corresponding linear bar 2.

Figure 3:
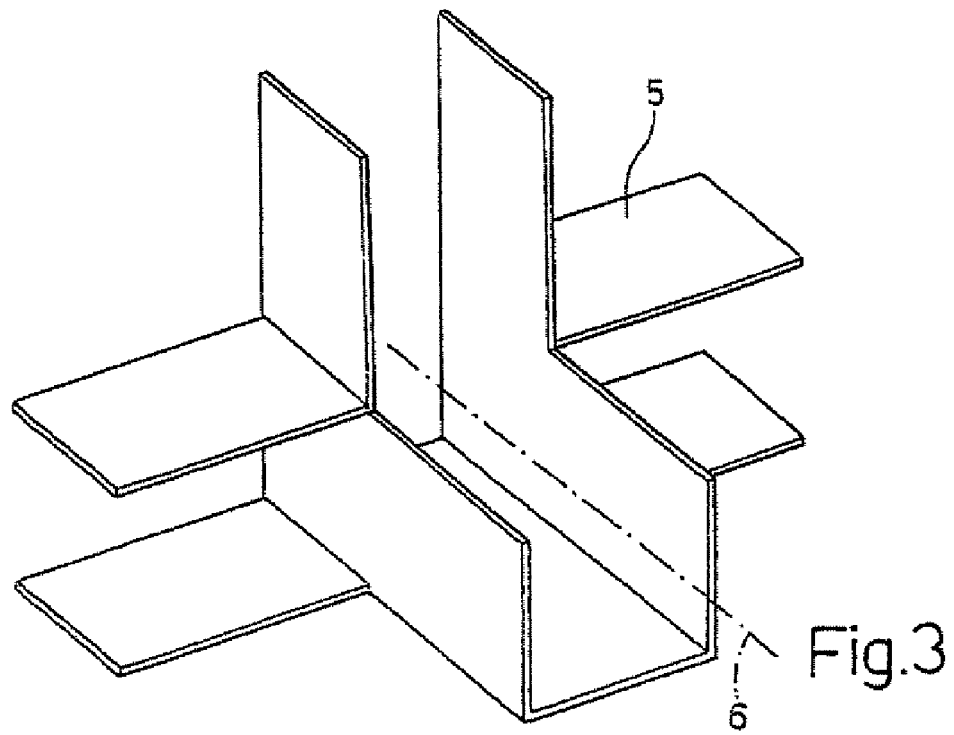
FIG. 3 is a perspective view of a load-bearing element obtained by extrusion of the jointing body of FIG. 1.
Figure 4:
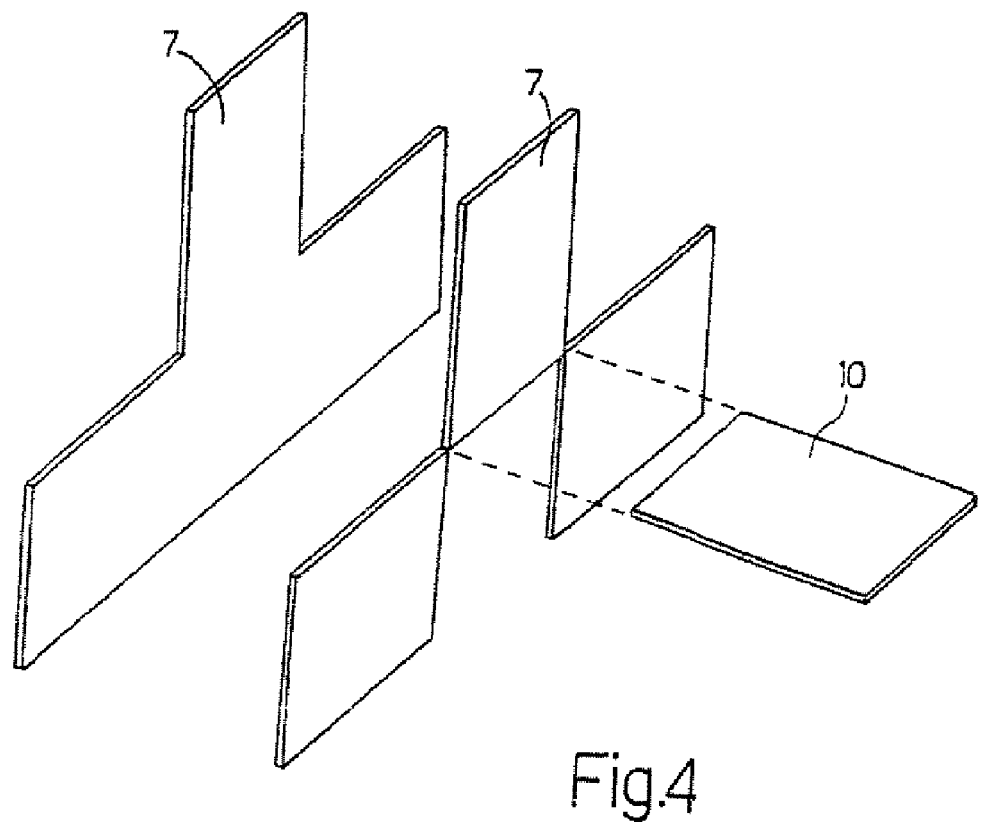
FIG. 4 is a perspective view of a pair of closing metal sheets of the jointing body of FIG. 1.

According to what is illustrated in FIGS. 3 and 4, the jointing body 3 is of a box type and is made up of the union of a load-bearing element 5, which is substantially obtained by extrusion and has a given direction 6 of extrusion, with a pair of planar closing metal sheets 7. The sheets 7 are set perpendicular to the direction 6 of extrusion and are welded to the load-bearing element 5 on opposite sides of the load-bearing element 5 itself.

Preferably, the planar closing metal sheets 7 are welded to the load-bearing element 5 by means of a welding of an FSW (Friction-Stir Welding) type. Said known welding methodology enables a weld between two metal elements to be carried out by acting on just one of the two metal elements and in particular on the metal element set in a more accessible position. In FIG. 1, the reference number 8 designates the lines of welding that join a closing metal sheet 7 to the load-bearing element 5. Preferably, also the jointing body 3 is welded to the linear bars 2 by means of a weld of an FSW type. In FIG. 1, the reference number 9 designates the areas of welding that join the jointing body 3 to the linear bars 2.

According to what is illustrated in FIGS. 3 and 4, the jointing body 3 comprises a further plane metal sheet 10 set parallel to the direction 6 of extrusion of the load-bearing element 5 and welded to the load-bearing element 5 itself to define a respective pocket 4. The metal sheet 10 could be obtained by direct extrusion at the moment of fabrication of the load-bearing element 5. However, it is preferable to weld the metal sheet 10 to the load-bearing element 5 subsequently and after having coupled to the load-bearing element 5 the linear bar 2 which is inserted in the pocket 4 defined by the metal sheet 10 both to enable a convenient insertion of the linear bar 2 and to enable recovery of any play or interference caused by the tolerances of fabrication.

During fabrication of the frame 1, the closing metal sheets 7 are welded to the load-bearing element 5 prior to coupling of the respective linear bars 2 to the load-bearing element 5 itself, or else at least one closing metal sheet 7 is welded to the load-bearing element 5 after having coupled a number of respective linear bars 2 to the load-bearing element 5 itself. The choice between the two modalities of fabrication described above depends both upon possible production constraints, which impose, for example, insertion of a linear bar 2 with a transverse movement and not with a longitudinal movement and upon the need to recover any play or interference caused by the tolerances of fabrication.

Figure 9:
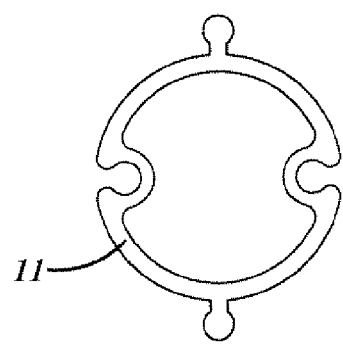
FIG. 9 is a perspective view of a simple element designed to provide a load-bearing element of the same type as that of FIG. 7.
Figure 10:
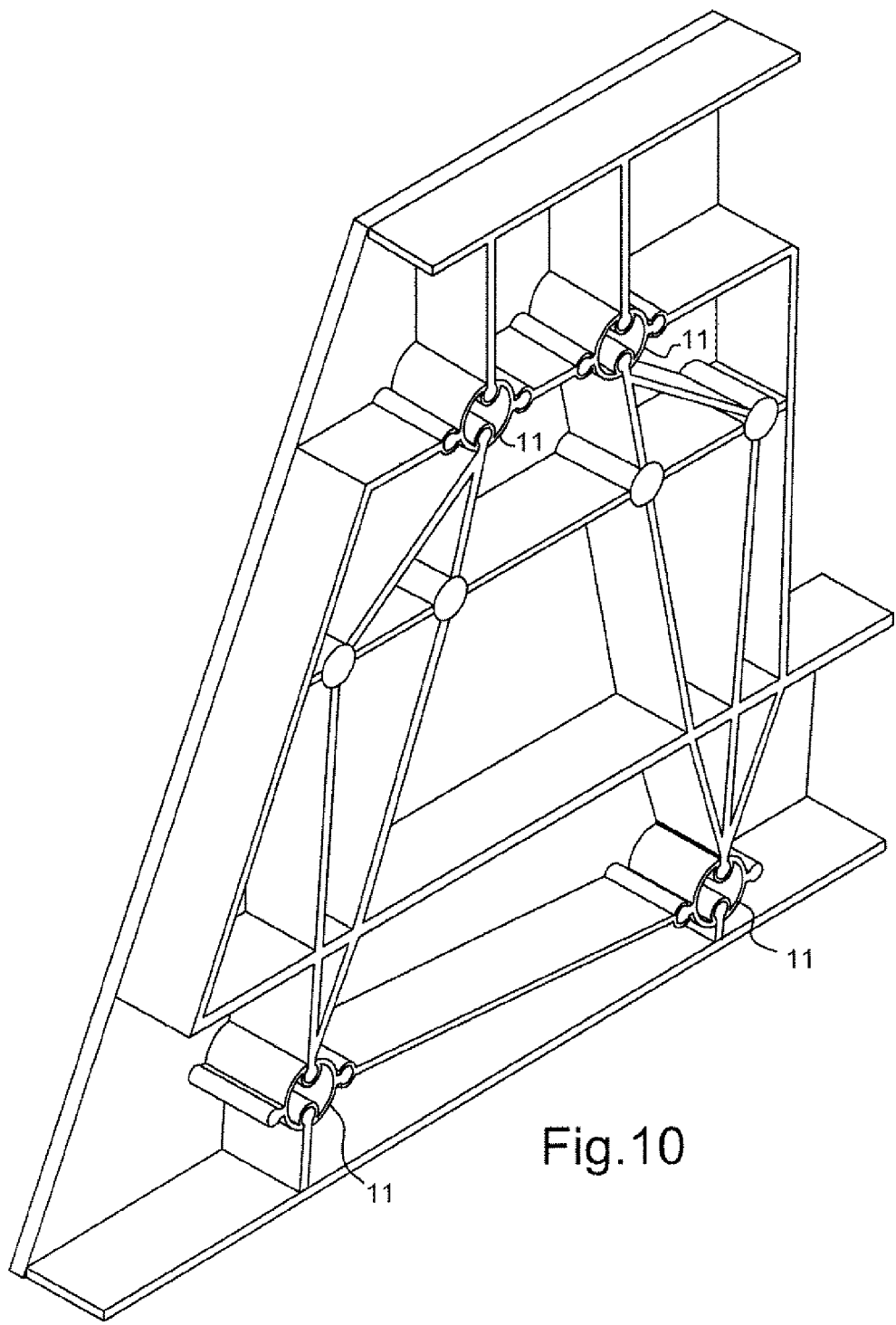

According to a different embodiment, the load-bearing element 5 of a jointing body 3 is formed by the lateral union of a number of simple elements 11 (one of said elements 11 is illustrated in FIG. 9), each of which is obtained directly via extrusion and has a given direction 6 of extrusion parallel to the direction 6 of extrusion of the other simple elements 11. Said constructional modality is normally used when the load-bearing element 5 of a jointing body 3 has large dimensions and a complex shape. The simple elements 11 making up a load-bearing element 5 are joined to one another laterally via welding and/or by being slotted together mechanically (like the pieces of a jig-saw puzzle). Preferably, all the simple elements 11 making up one and the same load-bearing element 5 are the same as one another.

More complex geometries such as ones involving angles of other than 90° between the linear bars 2 or different extrusion sections can be obtained, starting from the jointing body 3 described above, by machining the load-bearing element 5 according to the different planes and appropriately bending the closing metal sheets 7.

Figure 5:
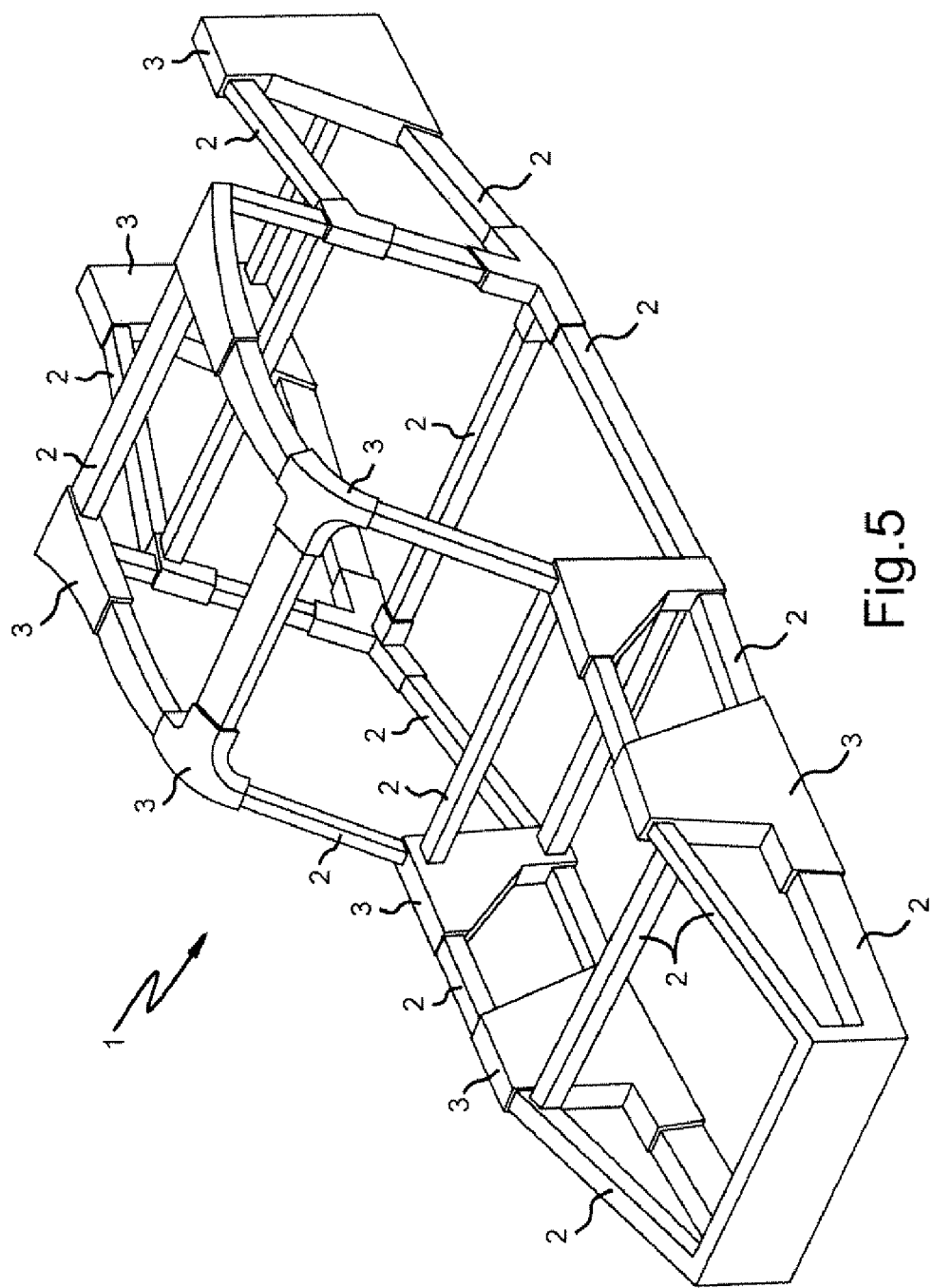
FIG. 5 is a schematic perspective view, with parts removed for reasons of clarity, of a frame of a motor vehicle made according to the present invention.

FIG. 5 illustrates a frame 1 of a motor vehicle made of aluminum. In a way similar to the frame 1 illustrated in FIGS. 1-4, the frame 1 illustrated in FIG. 5 comprises a number of linear bars 2, which have a constant cross section, are obtained by extrusion, and are joined to one another by means of welding at structural nodes defined by jointing bodies 3. In particular, four jointing bodies 3 are present in the area of attachment of each suspension.

Figure 6:
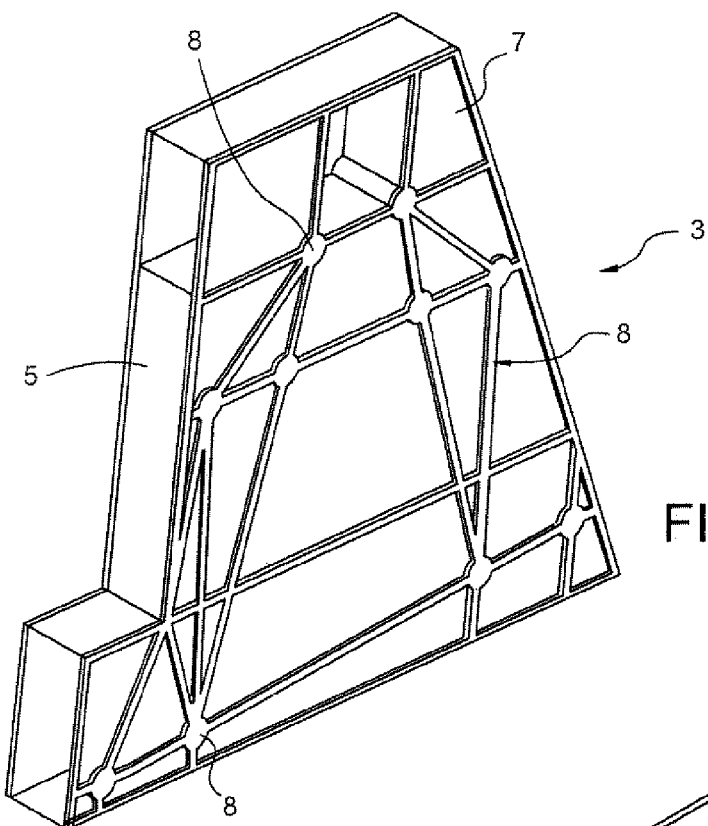
FIG. 6 is a perspective view, at an enlarged scale, of a jointing body of the frame of FIG. 5 set in a position corresponding to an area of attachment of a front suspension.
Figure 7:
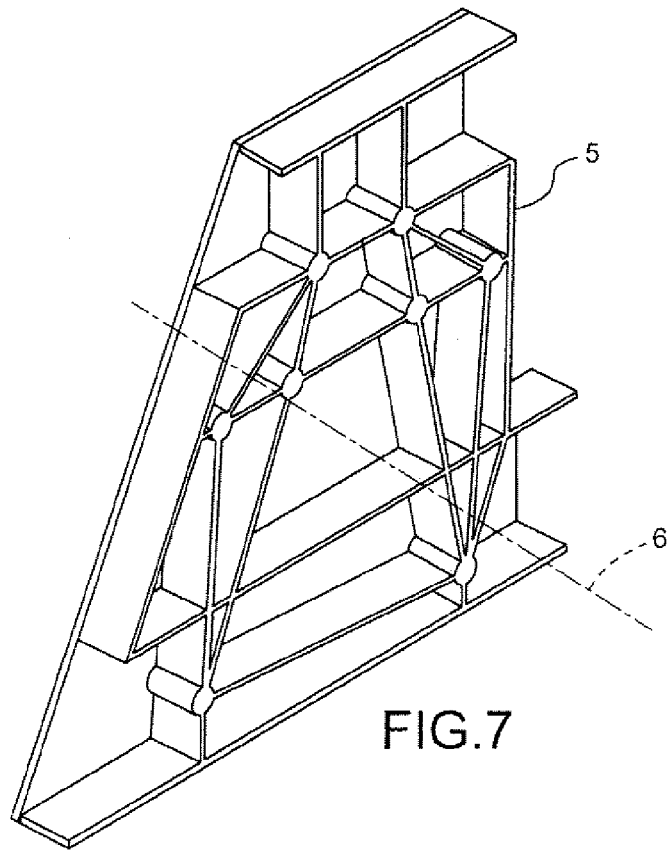
FIG. 7 is a perspective view of a load-bearing element obtained by extrusion of the jointing body of FIG. 6.
Figure 8:
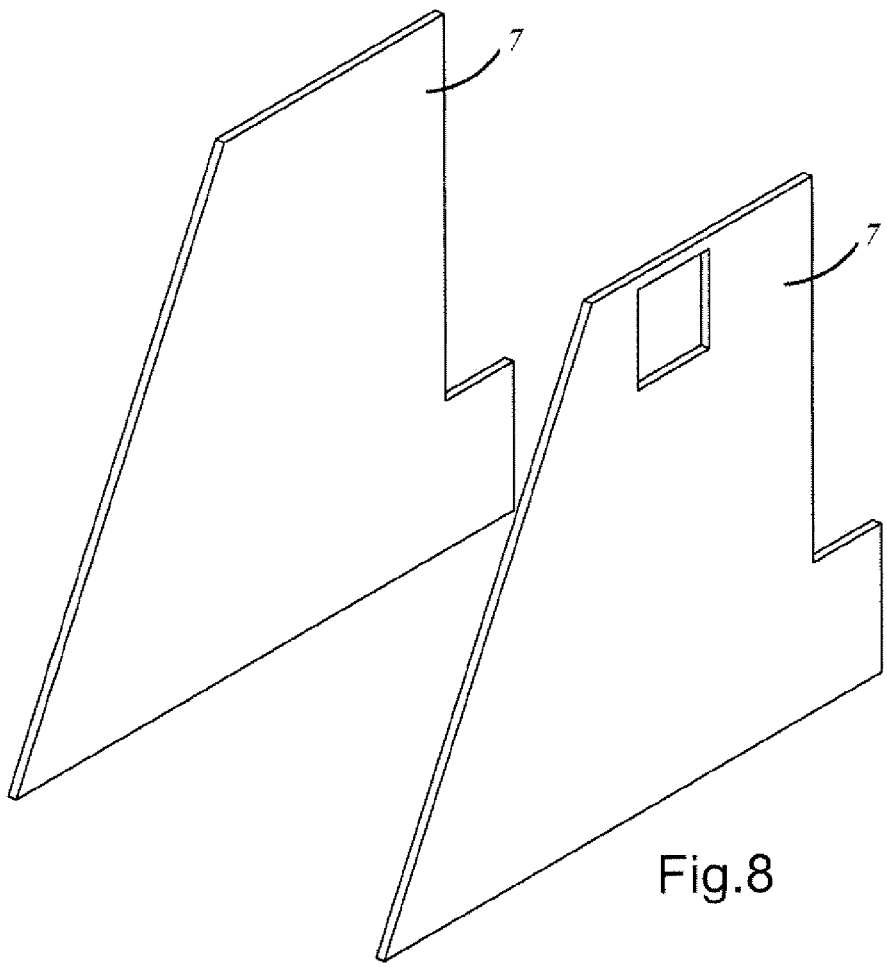
FIG. 8 is a perspective view of a pair of closing metal sheets of the jointing body of FIG. 6.

FIG. 6 is a perspective view of a jointing body 3 of the frame of FIG. 5 set in an area of attachment of a front suspension. According to what is illustrated in FIGS. 7-9, the jointing body 3 is of a box type and is made up of the union of a load-bearing element 5, which is substantially obtained by extrusion and has a given direction 6 of extrusion, with a pair of plane closing metal sheets 7, which are set perpendicular to the direction 6 of extrusion and are welded to the load-bearing element 5 on opposite sides of the load-bearing element 5 itself. In FIG. 6, the reference number 8 designates the lines of welding that join a closing metal sheet 7 to the load-bearing element 5.

The metal frames 1 described above present various advantages, in so far as the jointing bodies 3 of said frames 1 prove to be light on account of the presence of internal cores and prove to be simple and economically advantageous to produce particularly in the case of limited production. Furthermore, it is extremely simple and fast to make constructional variants even to individual jointing bodies 3.

The invention claimed is:

1. A metal frame made up of the union of a plurality of extruded elements; said frame comprising a plurality of linear bars, which have a constant cross section, are obtained by extrusion, and are joined to one another by means of welding at structural nodes defined by jointing bodies, each of said jointing bodies having a number of respective pockets which are designed to house corresponding linear bars, each of said jointing bodies having a box type structure and made up of the union of a respective load-bearing elements which is substantially obtained by extrusion and has a given direction of extrusion, with at least one pair of planar metal sheets, which are set perpendicular to the direction of extrusion and are welded to the load-bearing element on opposite sides of the load-bearing element, said frame having at least one load-bearing element formed by the lateral union of a number of simple elements, each of said simple elements being obtained directly via extrusion and having a given direction of extrusion parallel to the direction of extrusion of the other simple elements, the simple elements making up a load-bearing element being joined to one another laterally by mechanical slotting means.

2. The frame according to claim 1, wherein said simple elements making up a load-bearing element are also joined to one another laterally by means of welding.

3. The frame according to claim 1, wherein all of the simple elements making up one load-bearing element are the same as one another.

4. The frame according to claim 1, wherein the plane closing metal sheets are welded to the load-bearing element by means of a friction stir welding type.

5. The frame according to claim 1, wherein one of said jointing bodies comprises at least one further plane metal sheet set parallel to the direction of extrusion and welded to the load-bearing element to define a respective pocket.

6. A motor vehicle provided with a metal frame made up of the union of a plurality of extruded elements, said frame comprising a plurality of linear bars which have a constant cross section, are obtained by extrusion, and are joined to one another by means of welding at structural nodes defined by jointing bodies, each of said jointing bodies having a number of respective pockets which are designed to house corresponding linear bars, each jointing bodies has a box type structure and is made up of the union of a respective load-bearing element which is substantially obtained by extrusion and has a given direction of extrusion, with at least one pair of plane closing metal sheets which are set perpendicular to the direction of extrusion and are welded to the load-bearing element on opposite sides of the load-bearing element, said motor vehicle having at least one load-bearing element formed by the lateral union of a number of simple elements, each of which is obtained directly via extrusion and has a given direction of extrusion parallel to the direction of extrusion of the other simple elements, said simple elements making up a load-bearing element being joined to one another laterally by mechanical slotting means.

7. A method for the fabrication of a metal frame made up of the union of a plurality of extruded elements; the method comprising the steps of:

obtaining a plurality of linear bars having a constant cross section by extrusion, obtaining a number of jointing bodies, each of which has a box type structure and has a number of pockets designed to house corresponding linear bars, each of said jointing bodies being obtained by joining a load-bearing element, which is substantially obtained by extrusion and has a given direction of extrusion, with at least one pair of plane closing metal sheets, which are set perpendicular to the direction of extrusion and are welded to the load-bearing element on opposite sides of the load-bearing element, joining the linear bars at structural nodes defined by said jointing bodies, and making at least one load-bearing element by joining laterally a number of simple elements, each of said simple elements being obtained directly via extrusion and having a given direction of extrusion parallel to the direction of extrusion of the other simple elements, the simple elements making up a load-bearing element being joined to one another laterally by mechanical slotting means.

8. The method according to claim 7, wherein the simple elements making up a load-bearing element are also joined to one another laterally also by means of welding.

9. The method according to claim 7, wherein all of the simple elements (11) making up one of said same load-bearing elements are the same as one another.

10. The method according to claim 7, wherein the plane closing metal sheets are welded to the load-bearing element by means of a welding operation of a friction stir welding type.

11. The method according to claim 7, wherein the closing metal sheets are welded to the load-bearing element prior to coupling the respective linear bars to the load-bearing element.

12. The method according to claim 7, wherein at least one closing metal sheet is welded to the load-bearing element after having coupled a number of respective linear bars to the load-bearing element.

13. The method according to claim 7, wherein a jointing body comprises at least one further plane metal sheet set parallel to the direction of extrusion and welded to the load-bearing element to define a respective pocket.

14. The method according to claim 13, wherein the further plane metal sheet is welded to the load-bearing element to define the respective pocket after the pocket has been engaged by a corresponding linear element.

* * * * *